W. J. SCHLACKS.
CHECK VALVE STRUCTURE.
APPLICATION FILED JULY 25, 1918.

1,384,096. Patented July 12, 1921.

Witnesses.
a. H. Opsahl
E. E. Wells

Inventor.
W. J. Schlacks.
By his Attorneys.
Williamson Merchant

UNITED STATES PATENT OFFICE.

WILLIAM J. SCHLACKS, OF CHICAGO, ILLINOIS, ASSIGNOR TO McCORD AND COMPANY, OF CHICAGO, ILLINOIS, A CORPORATION OF DELAWARE.

CHECK-VALVE STRUCTURE.

1,384,096.

Specification of Letters Patent.

Patented July 12, 1921.

Application filed July 25, 1918. Serial No. 246,736.

*To all whom it may concern:*

Be it known that I, WILLIAM J. SCHLACKS, a citizen of the United States, residing at Chicago, in the county of Cook and State of Illinois, have invented certain new and useful Improvements in Check-Valve Structures; and I do hereby declare the following to be a full, clear, and exact description of the invention, such as will enable others skilled in the art to which it appertains to make and use the same.

My invention relates to force feed lubricators and provides an improved arrangement, in the pump mechanism thereof, of the delivery ball check valve.

In the pump mechanism of this character it has been difficult to obtain an arrangement of the delivery ball check seat for a minimum amount of pump clearance and there has also been considerable difficulty in obtaining highly efficient, yet comparatively cheap construction. These features, however, I accomplish in the present invention which is illustrated in the accompanying drawings wherein like characters indicate like parts throughout the several views.

Referring to the drawings.

Figure 1:
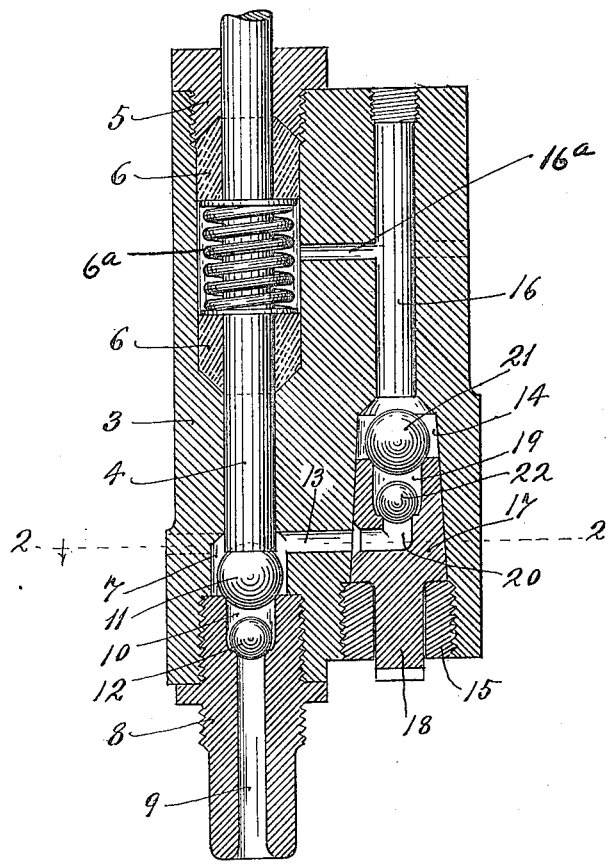
Figure 1 is a vertical section taken through the pump.
Figure 2:
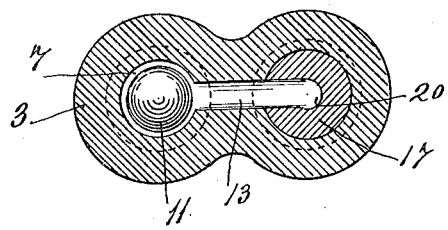
Fig. 2 is a horizontal section taken on the line 2—2 of Fig. 1.

The numeral 3 indicates the casting or body of the pump structure in which the customary pump piston 4 is arranged to reciprocate, as shown, through a gland 5 and spring-pressed packing rings 6. The body 3 is formed at its lower end with a ball chamber 7 and below said chamber is internally threaded to receive the threaded end of an oil inlet tube 8. This tube 8 has an axial passage 9 with enlarged upper extremity 10. The upper extremity of the enlarged bore 10 affords a seat for a main intake check valve 11, while the shoulder, at the junction of the cores 9 and 10 affords a seat for a smaller auxiliary intake check ball 12. The ball chamber 7, by a short oil duct 13, is connected to a tapered plug seat 14. The lower large extremity of this seat 14 is internally threaded to receive an externally threaded screw plug 15. The upper extremity of seat 14 has an outlet or delivery conduit 16. Fitted into the tapered seat 14 with a ground joint, is a tapered plug-like check valve cage 17 provided with a depending stem 18 that extends through the axial passage of the screw plug 15. This tapered check ball cage 17 is formed with an axial conduit 19, the lower end of which is contracted and laterally extended at 20. The lateral extension 20 is set in direct registration with the oil conduit 13 that leads from the intake check valve chamber 7. A main outlet check ball 21 is seated in the upper extremity of the axial duct 19 of the valve cage 17 and a smaller secondary outlet check ball 22 is seated on the shoulder formed at the junction of the conduits 19 and 20. Obviously, this ground seat tapered check ball cage positively prevents leakage of oil around the same and cuts off all communication between the intake and delivery conduits of the pump except through the check ball controlling conduit 19—20. Also, of course, in this pump, as in other pumps, the intake and discharge check balls operate to produce a flow of the oil in a constant direction under reciprocation of the pump piston.

The internally threaded lower end extension of the tapered seat 14 is of such size that a tool suitable for reaming out the said seat may be freely inserted and also, of course, it is of such size that the plug or valve cage 17 may be freely inserted or removed. With the plug or cage 17 provided with a projecting stem and by application of the proper tools, such as a screw driver, to the projecting end of the stem, the said cage may be oscillated to aline passages 13 and 20 or turned into a position in which the duct 13 will be closed, thus using the said cage as a cutoff valve if said cutoff action is desired at any time.

The spring $6^a$ keeps the packing 6 always seated, and the passage $16^a$ permits the oil on the delivery side of the check valves to act on the packing 6 and keep the same seated under a pressure that equals the pressure under which the oil is delivered plus the pressure of the spring $6^a$.

The structures of the packing 6 and cooperating parts is not claimed in this application but is claimed in my co-pending application S. N. 245,976, filed August 8th, 1918.

The arrangement described is, therefore, highly efficient and may be made with facility under comparatively small cost.

What I claim is:

1. A pump mechanism comprising an integral pump body of oblong cross section, two parallel bores extending therethrough, a transverse passage connecting the same near the lower end, a plunger fitted in the upper end of one bore, a ball chamber formed near the lower end of said bore and a longitudinally apertured plug in the lower end of said bore, said plug forming an intake conduit, and a ball valve coöperating with the upper end thereof, the second bore being tapered near its lower end, a tapered check valve cage fitted therein, a plug screwed into the end of said bore having an aperture therein, and a stem on said cage extending through said aperture, a lateral opening in said cage communicating with the passage in said pump body, and a ball valve carried in said cage, the second bore above the cage forming an outlet passage for the pump.

2. A pump mechanism comprising a pump body having a bore extending longitudinally therethrough, the lower end of which is enlarged and formed as an integrally tapered chamber, circumferentially closed except for a transverse aperture extending therefrom forming an intake conduit for said chamber, a tapered check valve cage fitted in said chamber having a lateral opening communicating with said transverse aperture and having a stem projecting from the bottom thereof, a screw plug closing the lower end of said chamber having an aperture therethrough, the stem on said cage extending through said aperture, and ball check valves carried by said cage, the upper portion of said bore forming the outlet passage in said pump.

In testimony whereof I affix my signature in presence of two witnesses.

WILLIAM J. SCHLACKS.

Witnesses:
M. B. CRONIN,
C. J. COPLAND.